US008441359B2

(12) United States Patent
Ando et al.

(10) Patent No.: US 8,441,359 B2
(45) Date of Patent: May 14, 2013

(54) FIRE DISTINGUISHING DEVICE

(75) Inventors: Kumiko Ando, Yamato (JP); Atsushi Mammoto, Tokyo (JP); Isao Asano, Zama (JP); Hiroshi Nishizaki, Tokyo (JP); Takashi Shimokawa, Sagamihara (JP); Sadataka Yuchi, Chigasaki (JP)

(73) Assignee: Hochiki Corporation, Tokyo (JP)

( * ) Notice: Subject to any disclaimer, the term of this patent is extended or adjusted under 35 U.S.C. 154(b) by 334 days.

(21) Appl. No.: 12/747,642

(22) PCT Filed: Oct. 22, 2008

(86) PCT No.: PCT/JP2008/069124

§ 371 (c)(1), (2), (4) Date: Jun. 11, 2010

(87) PCT Pub. No.: WO2009/078219

PCT Pub. Date: Jun. 25, 2009

(65) Prior Publication Data

US 2010/0281947 A1 Nov. 11, 2010

(30) Foreign Application Priority Data

Dec. 17, 2007 (JP) ................................ 2007-324658

(51) Int. Cl.

| | |
|---|---|
| ***G08B 17/00*** | (2006.01) |
| ***G08B 17/10*** | (2006.01) |
| ***G01N 7/00*** | (2006.01) |

(52) U.S. Cl.

USPC ........... 340/584; 340/522; 340/627; 340/628; 340/630; 340/632; 73/23.31

(58) Field of Classification Search .................. 340/584, 340/628, 627, 629, 630, 632, 522; 73/23.31

See application file for complete search history.

(56) References Cited

U.S. PATENT DOCUMENTS

| | | | | |
|---|---|---|---|---|
| 7,142,105 B2 * | 11/2006 | Chen | ............................ | 340/521 |
| 2005/0200475 A1 | 9/2005 | Chen | | |

FOREIGN PATENT DOCUMENTS

| | | | |
|---|---|---|---|
| GB | 1586012 | * | 4/1978 |
| GB | 1586012 A | | 3/1981 |
| JP | 05-054271 | | 3/1993 |
| JP | 06-195574 | | 7/1994 |
| JP | 06-309574 | | 11/1994 |
| JP | 2000-137875 | | 5/2000 |
| JP | 2004-265148 | | 9/2004 |
| JP | 2006-163634 | | 6/2006 |

OTHER PUBLICATIONS

Japanese Patent Office; Search Report in International Patent Application No. PCT/JP2008/069124 dated Nov. 25, 2008.

Extended European Search Report in PCT Application No. PCT/JP2008069124, mailed Feb. 3, 2011.

Office Action issued in Japanese Patent Application No. 2009-546179; Nov. 20, 2012; 7 pages; Japanese Patent and Trademark Office.

* cited by examiner

*Primary Examiner* — Daniel Wu

*Assistant Examiner* — Mancil Littlejohn

(74) *Attorney, Agent, or Firm* — Wood, Herron & Evans, LLP

(57) ABSTRACT

A fire distinguishing device includes: a detection device which detects an outbreak of a fire; a fire presence/absence distinguishing device which distinguishes the presence or absence of the fire; and a cumulative time determining device which determines the cumulative time required for distinguishing the presence or absence of the fire, in the fire presence/absence distinguishing device. The cumulative time determining device distinguishes an environment type of an environment where the detection device is installed, or a phenomenon type of a phenomenon being detected by the detection device, and further determines the cumulative time according to the distinguished environment type or phenomenon type.

6 Claims, 13 Drawing Sheets

FIRE DISTINGUISHING DEVICE

TECHNICAL FIELD

The present invention relates to a fire distinguishing device which determines the presence or absence of fire based on phenomena such as variation in smoke density.

Priority is claimed on Japanese Patent Application No. 2007-324658, the contents of which are incorporated herein by reference.

BACKGROUND ART

A conventional fire distinguishing device detects smoke, heat, or flames or the like, and based on factors such as the concentration of smoke detected, distinguishes the presence or absence of fire. For example, a fire sensor has been proposed having a smoke detection section which detects a smoke signal which varies according to the concentration of smoke, an external temperature detection section which detects and outputs the external temperature of the sensor, and an internal temperature detection section which detects and outputs the internal temperature of the sensor. This fire sensor detects the external temperature, the internal temperature, and the temperature difference between the external temperature and the internal temperature when exposed to the heat of a fire, and decides a predetermined correction factor based on the detected external temperature and the temperature difference. Furthermore, this fire sensor, by multiplying the decided correction factor with the smoke signal detected by the smoke detection section to correct the smoke detection characteristics, achieves the early detection of fires and prevents false alarms (refer to Patent Document 1, for example).

In fire sensors such as that described above, to detect a fire at an early stage and issue an alarm is of foremost importance. However, suppressing false alarms when no fire exists is also important. Thus, as a feature to prevent false alarms when no fire exists, an accumulation feature has been used. This accumulation feature is a feature which, when for some reason the smoke concentration or the like reaches a constant reference value at which a fire outbreak is considered to have occurred, judges that an actual fire has occurred and issues an alarm only if the reference value continues to be maintained after a predetermined cumulative time has elapsed. Fire receivers exist which use this accumulation feature to detect fires at an early stage and reduce false alarms (refer to Patent Document 2, for example).

Patent Document 1: Japanese Unexamined Patent Application, First Publication No. 2000-137875

Patent Document 2: Japanese Unexamined Patent Application, First Publication No. 2004-265148

DISCLOSURE OF INVENTION

Problems to be Solved by the Invention

However, depending on the environment where the fire sensor described above or the like is installed, smoke or the like which is the sensor target may be produced from a source other than fire. In this case, because the preset cumulative time is not sufficient, the fire distinguishing device sometimes distinguishes a fire outbreak despite there being no fire, and issues an alarm. On the other hand, in environments where smoke or the like is unlikely to result from anything other than fire, despite the probability of fire being high whenever smoke or the like is detected, because an unnecessarily long cumulative time is set, a fixed interval is needed from when the smoke or the like from a real fire is detected until a fire outbreak is distinguished and an alarm is issued.

In accordance with the above circumstances, an object of the present invention is to provide a fire distinguishing device which can suppress the occurrence of false alarms in the absence of fire, and is capable of issuing an alarm at an early stage when an actual fire occurs.

Means for Solving the Problems

To solve the problems above and achieve the objective, the present invention employs the following measures:

That is, (1) a fire distinguishing device of the present invention is provided with: a detection device which detects an outbreak of a fire; a fire presence/absence distinguishing device which distinguishes the presence or absence of the fire; and a cumulative time determining device which determines a cumulative time required for distinguishing the presence or absence of the fire, in the fire presence/absence distinguishing device, wherein the cumulative time determining device distinguishes an environment type of an environment where the detection device is installed, or a phenomenon type of a phenomenon being detected by the detection device, and further determines the cumulative time according to the distinguished environment type or the phenomenon type.

(2) A construction may be employed in which the cumulative time determining device determines the distinguished phenomenon type, and if the distinguished phenomenon type is a predetermined phenomenon type, regardless of the environment type, determines the cumulative time according to the distinguished phenomenon type.

(3) A construction may be employed in which the cumulative time determining device distinguishes the phenomenon type based on variation in a fire quantity as detected by the detection device over a predetermined first time period, and distinguishes the environment type based on variation in a fire quantity over a predetermined second time period which is longer than the first time period.

(4) A construction may be employed in which the cumulative time determining device, when extending the cumulative time according to the distinguished environment type, if the distinguished environment type is a predetermined first environment type, waits for a predetermined time without extending the cumulative time, and upon confirming by means of the fire presence/absence distinguishing device that no fire exists within this predetermined time, implements extension of the cumulative time.

(5) A construction may be employed in which the cumulative time determining device, when reducing the cumulative time according to the distinguished environment type, if the distinguished environment type is a predetermined second environment type, implements reduction of the cumulative time without waiting for the predetermined time.

(6) A construction may be employed in which the cumulative time determining device, if the predetermined time has elapsed after the cumulative time is determined according to the distinguished phenomenon type, averts determination of the cumulative time even if a phenomenon type newly distinguished in a subsequent time period before the cumulative time is first extended, is the predetermined phenomenon type.

(7) A construction may be employed in which the detection device which detects a fire quantity, and the fire presence/absence distinguishing device, if the fire quantity detected by the detection device is equal to or greater than a predetermined state quantity, distinguishes that a fire exists regardless of the cumulative time.

(8) A construction may be employed in which the fire presence/absence distinguishing device, if a moving average of the fire quantity detected by the detection device over a predetermined time is equal to or greater than a predetermined state quantity, judges that a fire exists regardless of the cumulative time.

Effects of the Invention

According to the fire distinguishing device of the present invention related to (1) above, the cumulative time determining device determines the cumulative time according to the distinguished phenomenon type or environment type. Thus, the cumulative time can be determined according to the type of environment, for example environments where smoke tends to occur without fire, and environments where smoke is seldom produced. Moreover, when a phenomenon indicating a high probability of a fire outbreak is detected, for example when the average smoke concentration over a predetermined time is within a predetermined range, the cumulative time can be determined according to that phenomenon type. Accordingly, with the fire distinguishing device of the present invention, a reduction in false alarms in a manner corresponding to the installed environment can be realized, while also realizing the early detection of a fire outbreak based on phenomena that lead to fires.

In the case of (2) above, the cumulative time determining device, when the distinguished phenomenon type is a predetermined phenomenon type, determines the cumulative time regardless of the environment type. In other words, for example when a fire occurs in an environment where smoke tends to occur without fire, and which demands a fixed cumulative time or longer, when a phenomenon is detected that possesses the characteristics of a fire outbreak, the cumulative time can be reduced, thus enabling the early detection of fire outbreaks.

In the case of (3) above, the cumulative time determining device, because a first time serving as a reference for distinguishing phenomenon types is shorter than a second time serving as a reference for distinguishing environment types, distinguishes the environment type from long term trends in the detection values of the detection device in the installed environment, and distinguishes the phenomenon type based on moment to moment variation in the detection values produced by a fire, and can prioritize the distinguished phenomenon type when determining the cumulative time.

In the case of (4) above, the cumulative time determining device, when extending the cumulative time, after distinguishing the environment type as a first environment type, waits for a predetermined time before extending the cumulative time. In other words, even if the detection device is installed in an environment where smoke tends to occur without fire, the cumulative time can be extended after the fact that no smoke or the like has been produced by an actual fire is confirmed. Accordingly, in the fire distinguishing device of the present invention, when a fire actually occurs, the fire can be detected while waiting to extend the cumulative time, thus avoiding delays in fire detection.

In the case of (5) above, the cumulative time determining device, when the environment type is a second environment type, shortens the cumulative time without waiting for the predetermined time. Thus, when the detection device is installed in an environment where smoke is seldom produced without fire, the cumulative time can be shortened immediately, thereby realizing early detection of fire outbreaks.

In the case of (6) above, the cumulative time determining device, after distinguishing a predetermined phenomenon type and completing further monitoring for a predetermined time, if a predetermined phenomenon type is newly distinguished in the subsequent time period before the cumulative time is first extended, does not determine the cumulative time according to this phenomenon type. Accordingly, even if a predetermined phenomenon type is distinguished which presents a high probability of a fire, the cumulative time is extended if subsequently no fire is detected, thereby reducing false alarms in the absence of fire.

In the case of (7) above, the fire presence/absence distinguishing device, when a fire quantity (for example smoke concentration) meets or exceeds a predetermined status quantity a predetermined number of times in succession, distinguishes a fire outbreak regardless of the cumulative time. Thus, a fire that spreads rapidly can be detected at an early stage.

In the case of (8) above, the fire presence/absence distinguishing device, when the moving average of a fire quantity (for example smoke concentration) over a predetermined time meets or exceeds a predetermined state quantity, distinguishes a fire outbreak regardless of the cumulative time. Thus, even if a fire is releasing smoke little by little and the smoke concentration fails to reach the normal reference value for distinguishing the presence or absence of a fire, the fire can still be reliably detected.

BRIEF DESCRIPTION OF THE REFERENCE SYMBOLS

Figure 1:
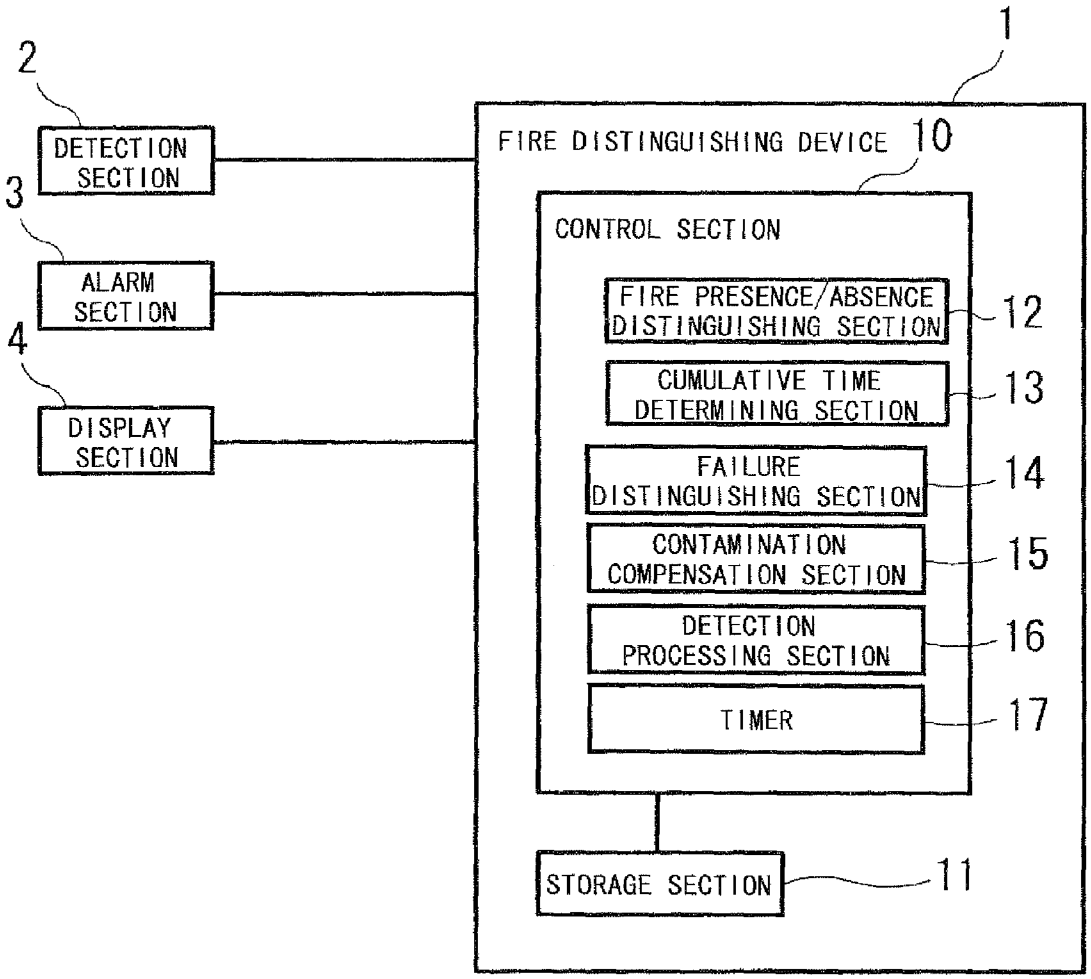
FIG. 1 is a block diagram showing the functional concept of an electrical configuration of a fire distinguishing device according to a first embodiment of the present invention.

1 Fire distinguishing device
2 Detection section
3 Alarm section
4 Display section
10 Control section
11 Storage section
12 Fire presence/absence distinguishing section

13 Cumulative time determining section
14 Failure distinguishing section
15 Contamination compensation section
16 Detection processing section
17 Timer

BEST MODE FOR CARRYING OUT THE INVENTION

Embodiments of a fire distinguishing device according to the present invention are described in detail below with reference to the appended drawings. First, [I] the fundamental concepts common to each embodiment are described. Then, [II] the specific details of each embodiment are described, and finally [III] modified examples of these embodiments are described. However, the various embodiments shall not be construed as limiting the invention.

[1] Fundamental Concepts Common to the Embodiments

First, the fundamental concepts that are common to the embodiments are described. The object of the fire distinguishing devices according to the embodiments is to judge the presence or absence of fire based on a detected fire quantity such as smoke concentration.

The installation location of the fire distinguishing devices according to the embodiments is arbitrary; for example, the device may be installed as a fire distinguishing device of a residential alarm device installed in the various rooms such as kitchen and bedrooms of a typical residence, or installed as a fire distinguishing device of a disaster prevention receiver to which a plurality of sensors installed in a factory or office building are connected. Furthermore, the object of fire detection by the fire detection device is arbitrary; for example, fire judgment may be performed by detecting the smoke, heat, or flames produced by a fire. In the examples below, the fire distinguishing device distinguishes fire based on smoke.

One characteristic of the fire distinguishing devices according to the embodiments, in general terms, is the inclusion of a cumulative time determining device which distinguishes the type of environment where the detection section which detects the smoke is installed, or the type of phenomenon in effect when smoke was detected, and determines the cumulative time according to the distinguished environment type or phenomenon type.

Accordingly, the cumulative time can be determined to suit the environment type, such as environments where smoke tends to occur without fire, or smoke is seldom produced, and when a phenomenon that indicates a high probability of a fire outbreak is detected, such as when the average smoke concentration over a predetermined time is within a predetermined range, the cumulative time can be determined to suit the type of phenomenon, and the dual objects of reducing false alarms and achieving early detection in the event of a real fire can both be realized concurrently.

[II] Specific Details of the Embodiments

Next, the specific details of the embodiments according to the present invention are described.

First Embodiment

A first embodiment is described. In the present embodiment, the cumulative time is determined according to the phenomenon type or the environment type.

(Construction of Fire Distinguishing Device)

The construction of the fire distinguishing device is described. FIG. 1 is a block diagram showing the functional concept of the electrical configuration of the fire distinguishing device. As shown in the figure, a fire distinguishing device 1 is provided with a control section 10 and a storage section 11, and is electrically interconnected with a detection section 2, an alarm section 3, and a display section 4.

Here, the detection section 2 detects a detection target for distinguishing fire, and corresponds to the smoke detection device in the claims. The specific construction of the detection section 2 is arbitrary. For example, a detection section 2 which uses photoelectric or ionization operating principles can be used. Furthermore, any known detection section 2 which detects heat or flames may be used. The alarm section 3, when the fire distinguishing device 1 distinguishes that a fire has occurred, issues an alarm. The display section 4 displays information such as the operating status of the fire distinguishing device 1 and detection section 2, and the judgment results of the fire distinguishing device 1. The specific construction of the alarm section 3 and the display section 4 is well known and therefore description is omitted.

A construction may be employed in which the fire distinguishing device 1 and the detection section 2, the alarm section 3, and the display section 4 occupy the same housing to constitute an alarm device, or a construction may be employed in which some or all of these structural elements serve as individual components in a fire alarm system.

(Construction of Fire Distinguishing Device: Control Section 10)

The control section 10, based on detection values such as smoke concentration detected by the detection section 2, distinguishes the presence or absence of fire and controls the issuing of alarms by the alarm section 3, and the alarm display and the like of the display section 4. The control section 10 is provided with a fire presence/absence distinguishing section 12, a cumulative time determining section 13, a failure distinguishing section 14, a contamination compensation section 15, a detection processing section 16, and a timer 17.

The fire presence/absence distinguishing section 12 distinguishes the presence or absence of fire based on detection values detected by the detection section 2, and corresponds to the fire presence/absence distinguishing device in the claims.

The cumulative time determining section 13, when the fire presence/absence distinguishing section 12 distinguishes the presence or absence of fire, determines the cumulative time used to reduce false alarms, and corresponds to the cumulative time determining device in the claims.

The failure distinguishing section 14 distinguishes whether or not a failure has occurred in the detection section 2. The contamination compensation section 15 compensates for the effects that contamination of the detection section 2 has on the detection values of the detection section 2. The detection processing section 16 subjects the detection values input from the detection section 2 to predetermined processing.

The timer 17 is used to calculate predetermined time periods when performing fire presence/absence distinguishing processing by means of the fire presence/absence distinguishing section 12 and cumulative time determination processing by means of the cumulative time determining section 13.

Details of the processing performed by the fire presence/absence distinguishing section 12 and the cumulative time determining section 13 are described later. Furthermore, the specific construction of the failure distinguishing section 14, the contamination compensation section 15, and the timer 17, being known technology, is not described herein. Moreover, the specific construction of the control section 10 is arbitrary, but can incorporate, for example, a control program such as an operating system, programs that define various procedures and the like, internal memory for storing the necessary data, and a CPU (Central Processing Unit) which executes the programs.

(Construction of Fire Distinguishing Device: Storage Section 11)

The storage section 11 is a device for storing the data required for various processing. The data stored in the storage section 11 includes a measured value table which stores: the measured values for a period equivalent to the cumulative time; a first time which serves as a reference for distinguishing the state of presence or absence of a fire and a phenomenon type; a second time which serves as a reference for distinguishing an environment type; a wait time used when extending the cumulative time; a reference value A which serves as a reference when the fire presence/absence distinguishing section 12 distinguishes the presence or absence of fire; a predetermined value B which serves as a reference when the cumulative time determining section 13 distinguishes the phenomenon type; a predetermined value C which serves as a reference when the cumulative time determining section 13 distinguishes the environment type; the current phenomenon type distinguished by the cumulative time determining section 13; an accumulation level referenced by the cumulative time determining section 13 when determining the cumulative time; and the cumulative time associated with the accumulation level.

The specific configuration of the storage section 11 is arbitrary. For example, a rewritable storage device such as RAM (Random Access Memory) can be used.

(Specific Example of Phenomenon Type Judgment Criteria)

Figure 2:
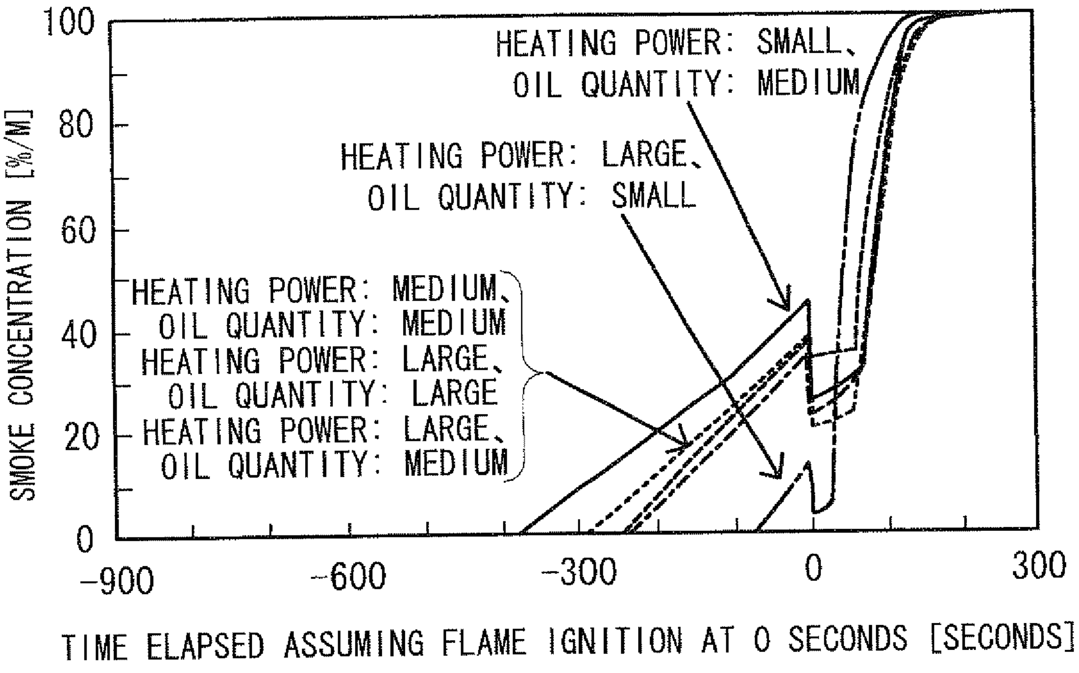
FIG. 2 is a graph showing the relationship between time and smoke concentration given a fire outbreak time of 0 seconds for a fire caused by cooking tempura, in the same embodiment.

Next, in the context of the cumulative time determining section 13 distinguishing the phenomenon type, as a specific example of judgment criteria, an example of a fire caused by cooking tempura is described. FIG. 2 is a graph showing the relationship between time and smoke concentration given a fire outbreak time of 0 seconds for a fire caused by cooking tempura.

As shown in FIG. 2, in the case of a tempura fire, a characteristic is observed whereby the smoke concentration rises at a substantially constant rate of change from 400 seconds before flame ignition until 200 seconds before flame ignition or thereabouts, and after flame ignition, the smoke concentration rises sharply. The rate of increase in smoke concentration before flame ignition, though varying according to the quantity of cooking oil and the amount of heating power applied to the cooking oil, is generally within a range from 0.1 (%/m/s) to 0.2 (%/m/s). In other words, when the rate of change of smoke concentration detected by the detection section 2 is within the range of the rate of increase of the smoke concentration before flame ignition, a judgment can be made that the observed phenomenon is the initial stages of a tempura fire. A fire alarm can be issued at an early stage based on this judgment.

In distinguishing the phenomenon at the early stage of a tempura fire as mentioned above, as an alternative to the rate of increase in smoke concentration, the phenomenon can be distinguished in the same manner based on the average smoke concentration value over an arbitrary predetermined time period.

(Processing Executed By Control Section 10)

Next, details of the processing executed by the control section 10 are described. FIG. 3 through FIG. 7 are flowcharts showing the flow of the processing executed by the control section 10.

(Processing Executed By Control Section 10: Overall Processing)

Figure 3:
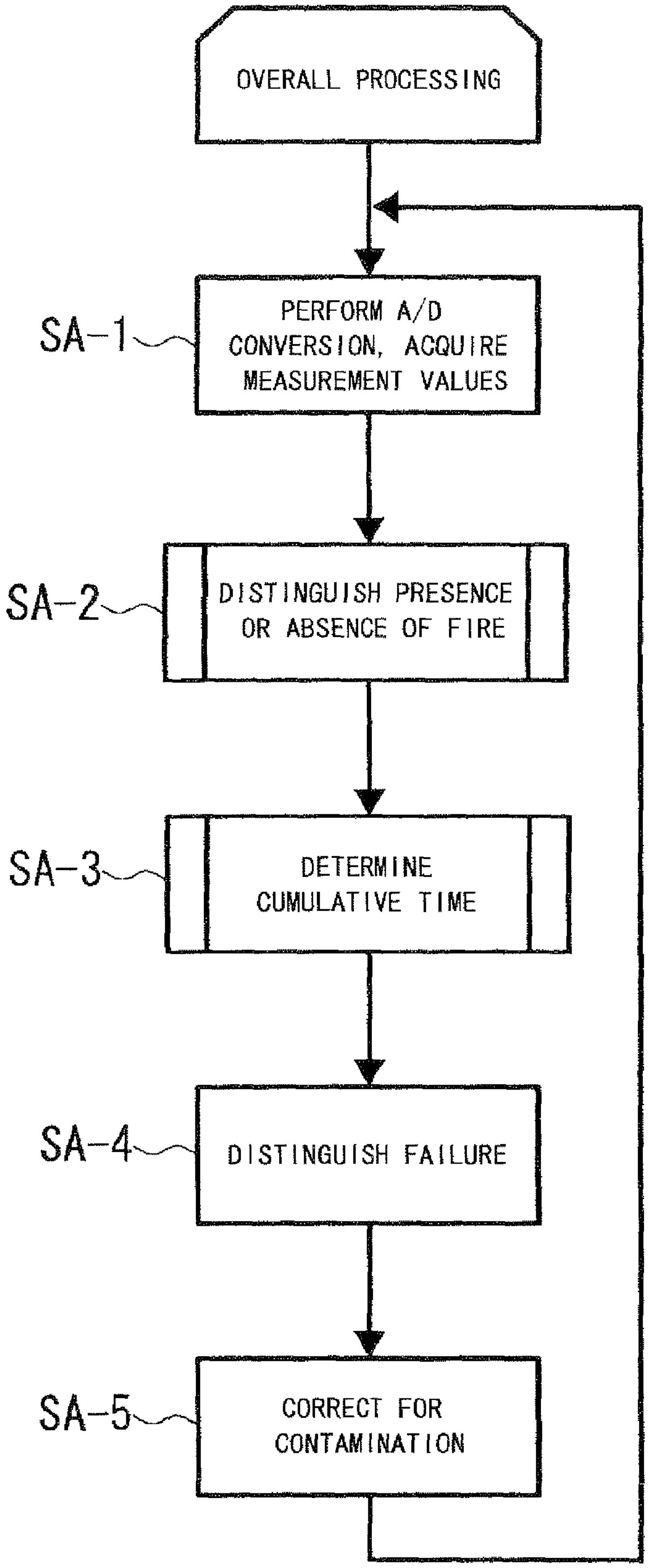
FIG. 3 is a flowchart showing the overall flow of the processing executed by the control section, in the same embodiment.
Figure 4:
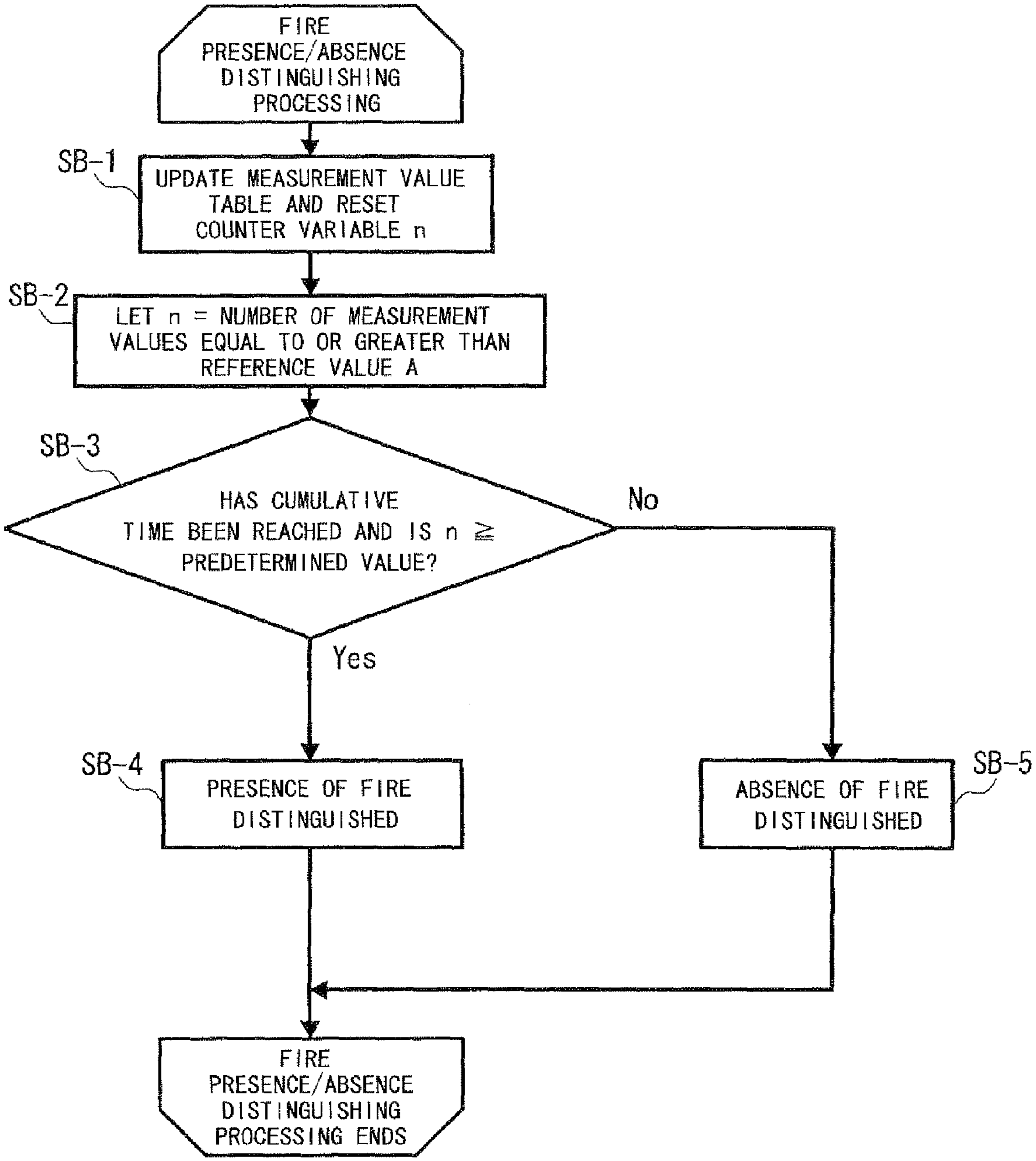
FIG. 4 is a flowchart showing the flow of fire presence/absence distinguishing processing in the same embodiment.
Figure 5:
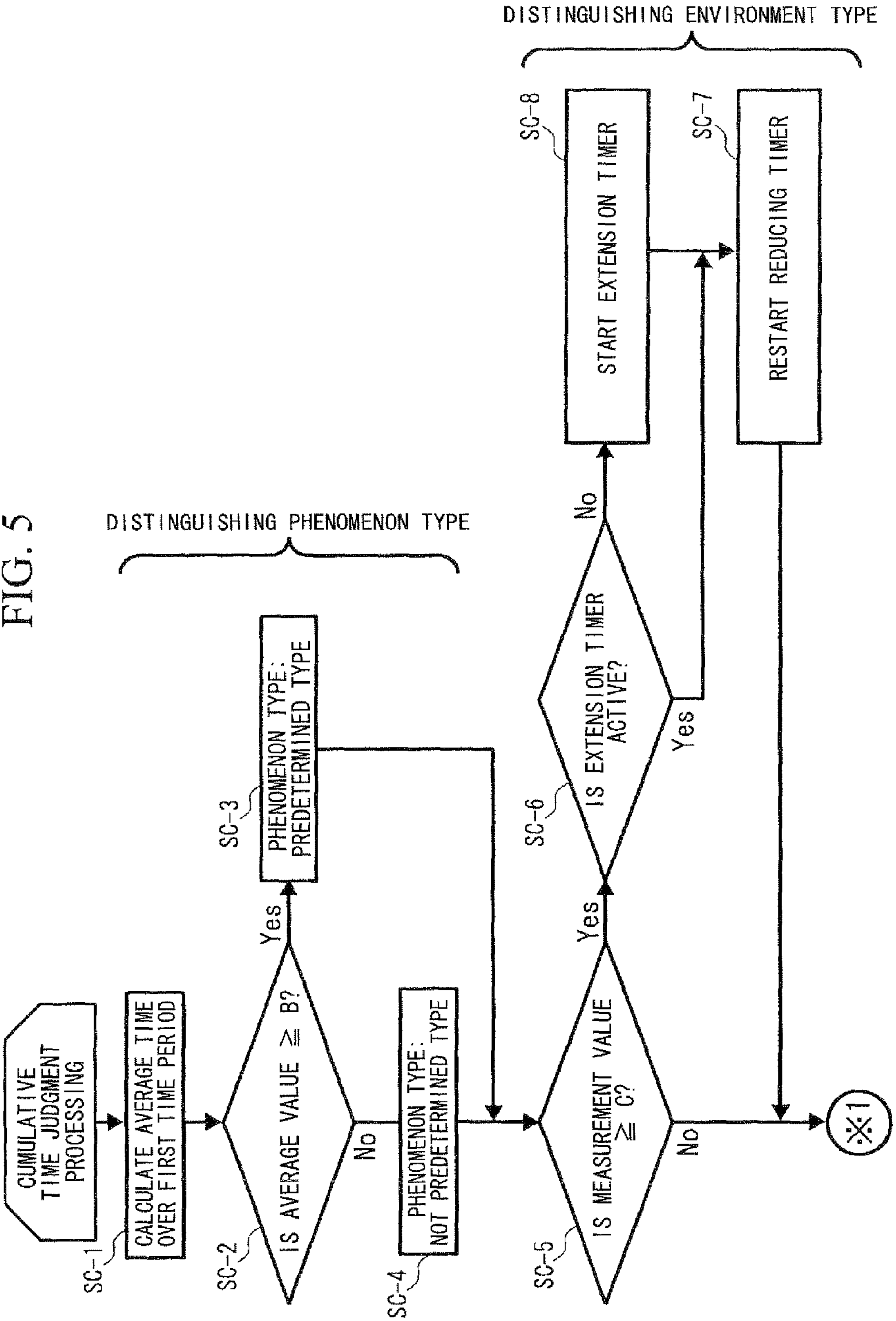
FIG. 5 is a flowchart showing the flow of cumulative time determination processing in the same embodiment.
Figure 6:
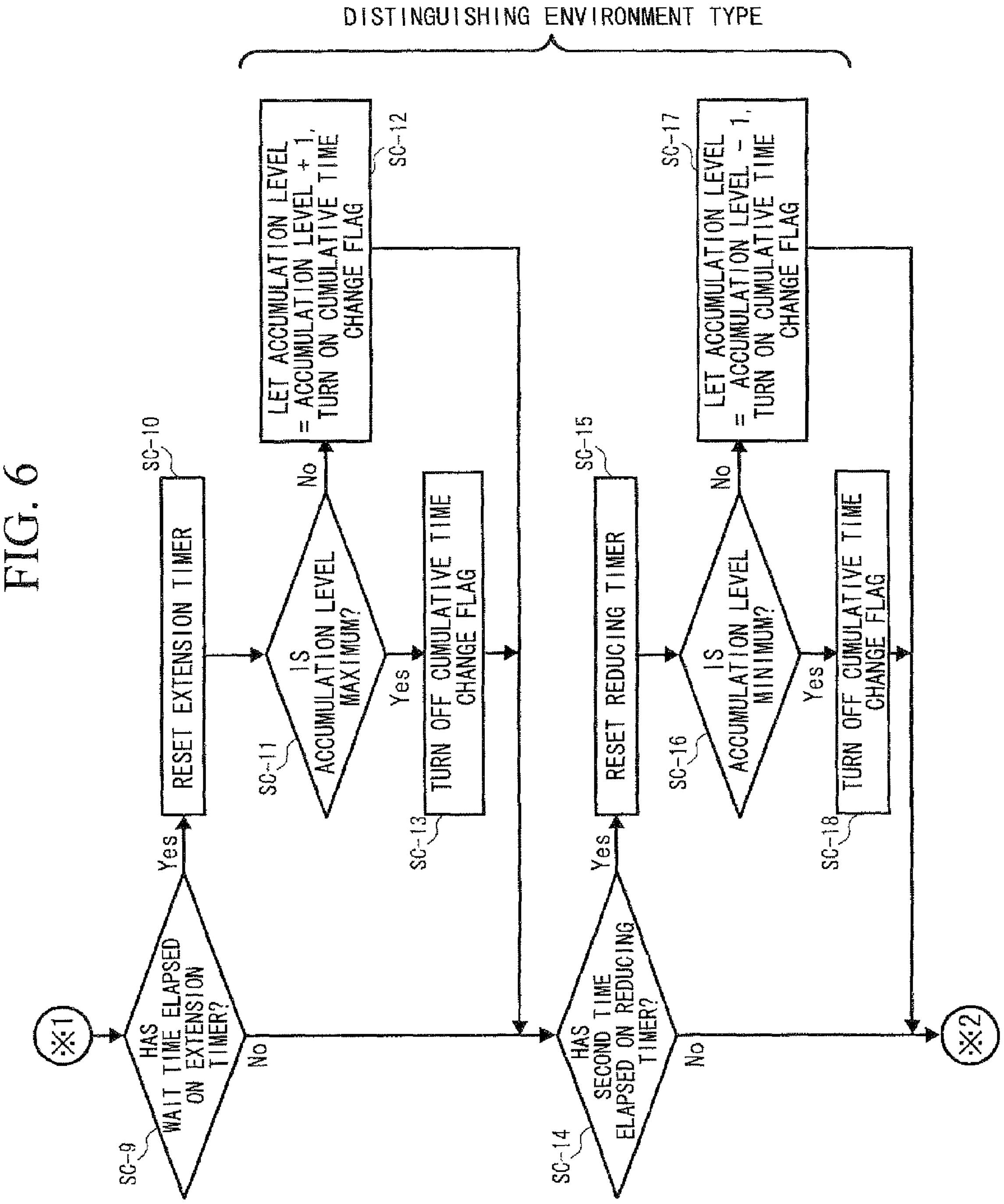
FIG. 6 is a flowchart showing the flow of cumulative time determination processing continued from FIG. 5.
Figure 7:
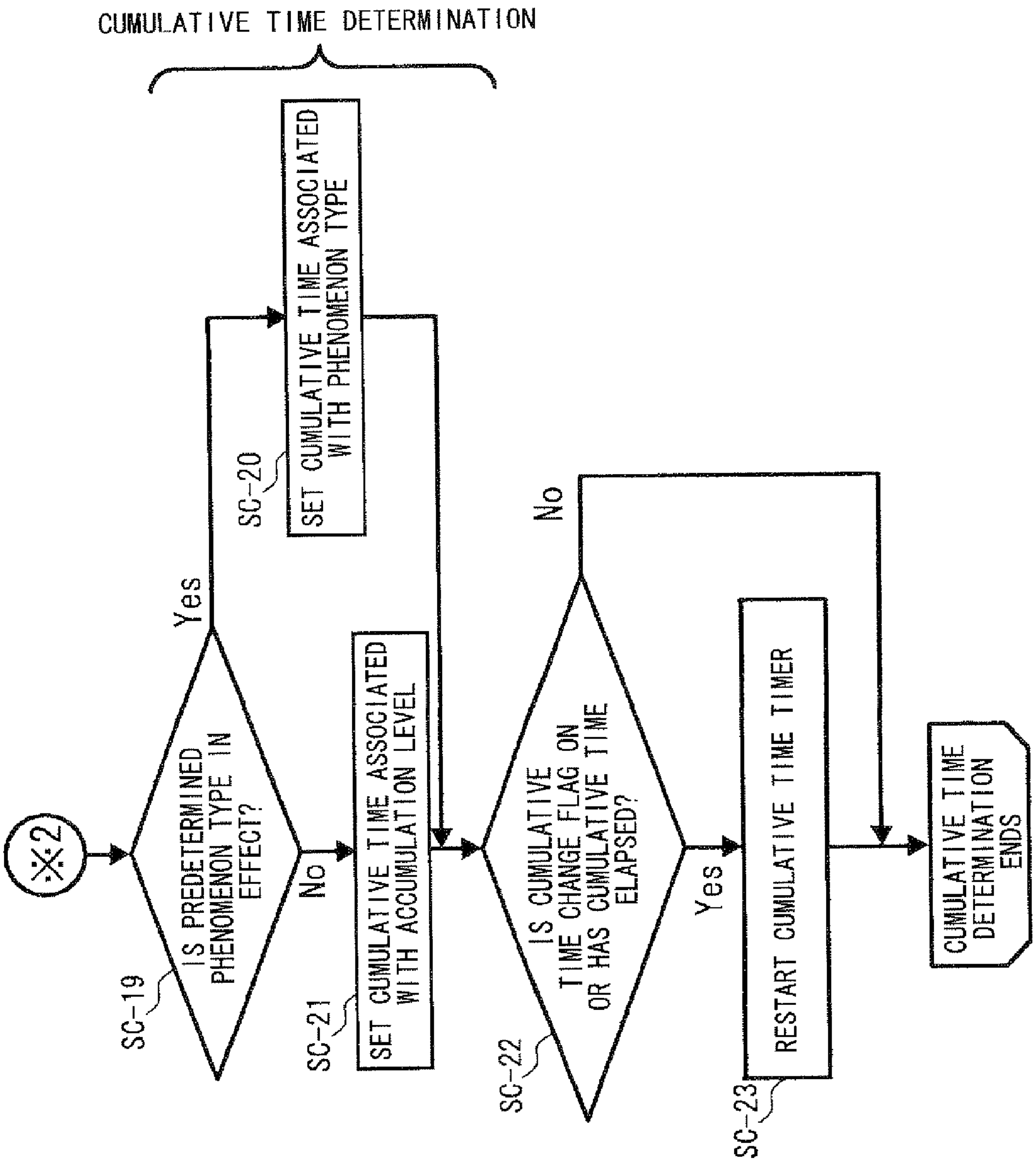
FIG. 7 is a flowchart showing the flow of cumulative time determination processing continued from FIG. 6.

First, the overall flow of the processing executed by the control section 10 is described with reference to FIG. 3. In the description below, an assumption is made that detection activity with respect to a detection target by the detection section 2 is being executed continuously in an alarm device or fire alarm system incorporating the fire distinguishing device 1.

In this case, the detection values detected by the detection section 2 are input into the detection processing section 16 as analog values. The detection processing section 16 subjects the analog values input from the detection section 2 to A/D conversion, thereby acquiring measurement values in digital form (step SA-1).

The detection processing section 16 outputs the acquired measurement values to the fire presence/absence distinguishing section 12. The fire presence/absence distinguishing section 12 to which the measurement values were input, based on these measurement values, executes fire presence/absence distinguishing processing to determine whether or not a fire has occurred (step SA-2). Details of this fire presence/absence distinguishing processing are described later.

Furthermore, the detection processing section 16 outputs the acquired measurement values to the cumulative time determining section 13. The cumulative time determining section 13 to which the measurement values were input, based on these measurement values, distinguishes an environment type or phenomenon type, and performs cumulative time determination processing to determine the cumulative time (step SA-3). Details of this cumulative time determination processing are described later.

Moreover, the detection processing section 16 also outputs measurement values to the failure distinguishing section 14 and the contamination compensation section 15. The failure distinguishing section 14 performs failure distinguishing processing based on these measurement values (step SA-4), and the contamination compensation section 15 subjects the measurement values to contamination correction processing based on the measurement values (step SA-5). This failure distinguishing processing and contamination correction processing can be performed by any known method, and therefore description thereof is omitted. Furthermore, the order in which the processing from step SA-2 to step SA-5 is executed is arbitrary; the steps may be executed in a different order, or executed concurrently.

(Processing Executed By Control Section 10: Fire Presence/Absence Distinguishing Processing)

Next, the fire presence/absence distinguishing processing in step SA-2 mentioned above is described with reference to FIG. 4. The fire presence/absence distinguishing section 12, upon receiving input of measurement values from the detection processing section 16, inputs the input measurement values into the storage section 11 as the most recent measurement values, updates the measurement value table in this storage section 11, and also resets the value of the counter variable n to 0 (step SB-1). Then, the fire presence/absence distinguishing section 12 references the measurement table of the storage section 11, and of the measurement values stored in this measurement table for a time period from the current time until a time preceding the current time by the cumulative time recorded in the storage section 11, counts the number of measurement values that are equal to or greater than the reference value A, and assigns the counted number to the counter variable n (step SB-2).

The processing procedure for counting the number of measurement values equal to or greater than the reference value A is arbitrary. For example, by repeating processing which increments the value of the counter variable n by 1 when the measurement value stored in the measurement value table is equal to or greater than the reference value A and does not increment the value of the counter variable n when the value is less than the reference value A, for each measurement value over the cumulative time, the number of measurement values that are equal to or greater than the reference value A can be counted.

Next, the fire presence/absence distinguishing section 12 references the storage section 11, and determines whether or not the time calculated by the cumulative time timer described later has reached the cumulative time recorded in the storage section 11, and the counter variable n has reached or exceeded a predetermined value (step SB-3). If the time calculated by the cumulative time timer has reached the cumulative time recorded in the storage section 11 and the counter variable n has reached or exceeded the predetermined value (Yes in step SB-3), then the fire presence/absence distinguishing section 12 distinguishes that a fire is present, and records this fact in the storage section 11 (step SB-4). On the other hand, if the time calculated by the cumulative time timer has not reached the cumulative time recorded in the storage section 11, or the counter variable n is less than the predetermined value (No in step SB-3), the fire presence/absence distinguishing section 12 distinguishes that a fire is absent, and records this fact in the storage section 11 (step SB-5).

Based on these results, the control section 10, if the presence of a fire is distinguished, issues an alarm by means of the alarm section 3. On the other hand, if a normal status is distinguished in which fire is absent, monitoring activity is continued without directing the alarm section 3 to issue an alarm.

(Processing Executed By Control Section 10: Cumulative Time Determination Processing)

Next, the cumulative time determination processing in step SA-3 mentioned above is described with reference to FIG. 5 through FIG. 7. The cumulative time determining section 13, upon receiving input of measurement values from the detection processing section 16, deems these input measurement values the latest values and calculates the average value of the measurement values over a first time period for distinguishing the phenomenon type (step SC-1). Then, a determination is made as to whether or not the calculated average value meets or exceeds a predetermined value B for distinguishing the phenomenon type (step SC-2). If the average value meets or exceeds the predetermined value B (Yes in step SC-2), then the cumulative time determining section 13 distinguishes that the phenomenon type is a predetermined phenomenon type (for example, the stage of oily smoke production in a tempura fire), and records this fact in the storage section 11 (step SC-3). On the other hand, if the average value is less than the predetermined value B (No in step SC-2), then the cumulative time determining section 13 distinguishes that the phenomenon type is not a predetermined phenomenon type, and records this fact in the storage section 11 (step SC-4).

Next, the cumulative time determining section 13 determines whether or not the measured values meet or exceed a predetermined value C for judging the environment type (step SC-5). If the measured values meet or exceed the predetermined value C (Yes in step SC-5), then the cumulative time determining section 13 determines whether or not the extension timer which measures the time period to wait before extending the cumulative time is active (step SC-6), and if the timer is active (Yes in step SC-6), restarts a reducing timer which measures a second time for distinguishing the environment type (step SC-7). On the other hand, if the extension timer is not active (No in step SC-6), the extension timer is started (step SC-8), and then the reducing timer is restarted (step SC-7).

The cumulative time determining section 13, when the time measured by the extension timer has reached a predetermined wait time (Yes in step SC-9), distinguishes the environment type as a first environment type (for example, an environment in which smoke occurs easily), resets the extension timer to 0 (step SC-10), and references the storage section 11 to determine whether or not the accumulation level is the maximum value (step SC-11). As a result, if the accumulation level is not the maximum value (No in step SC-11), the accumulation level is incremented by 1, and the cumulative time change flag is switched on (step SC-12). On the other hand, if the accumulation level is the maximum value (Yes in step SC-11), this accumulation level is maintained, and the cumulative time change flag is switched off (step SC-13).

Then, the cumulative time determining section 13 references the reducing timer, and if the second time has elapsed (Yes in step SC-14), distinguishes the environment type as a second environment type (for example, an environment where smoke is seldom produced), resets the reducing timer to 0 (step SC-15), and references the storage section 11 to determine whether or not the accumulation level is the minimum value (step SC-16). As a result, if the accumulation level is not the minimum value (No in step SC-16), the accumulation level is decremented by 1, and the cumulative time change flag is switched on (step SC-17). On the other hand, if the accumulation level is the minimum value (Yes in step SC-16), this accumulation level is maintained, and the cumulative time change flag is switched off (step SC-18).

Next, the cumulative time determining section 13 references the storage section 11, and if the phenomenon type is a predetermined phenomenon type (Yes in step SC-19), determines that the possibility of a fire occurring is high, and sets a predetermined cumulative time associated with this phenomenon type as the cumulative time referenced in step SB-3 of the fire presence/absence distinguishing processing described above (step SC-20).

If the phenomenon type is not a predetermined phenomenon type (No in step SC-19), the accumulation level recorded in the storage section 11 is referenced, and the cumulative time associated in the storage section 11 with this accumulation level is set as the cumulative time referenced in step SB-3 described above (step SC-21).

The cumulative time determining section 13 references the storage section 11, and if the cumulative time change flag is on, or the cumulative time timer has reached the cumulative time (Yes in step SC-22), restarts the cumulative time timer (step SC-23).

Effects of the First Embodiment

As described above, according to the first embodiment, because the cumulative time determining section 13 determines the cumulative time according to the distinguished phenomenon type or environment type, the cumulative time can be determined to suit an environment where smoke tends to occur without fire or an environment where smoke is seldom produced, and when a phenomenon which indicates a high likelihood of a fire occurring is detected such as the average value of smoke concentration over a predetermined time being within a predetermined range, the cumulative time can be determined according to this phenomenon type. Accordingly, a reduction in false alarms can be realized in a manner suited to the installation environment, and early detection of fire outbreaks can be realized based on phenomena that lead to fires.

Furthermore, if the distinguished phenomenon type is a predetermined phenomenon type, the cumulative time is determined without respect to the environment type. In other words, even if a fire occurs in an environment where smoke tends to occur without fire and which requires a fixed cumulative time or longer, the cumulative time can be shortened when a phenomenon that exhibits the characteristics of a fire outbreak is detected, thereby enabling the early detection of fire outbreaks.

Moreover, because the first time which serves as a reference for distinguishing the phenomenon type is shorter than the second time which serves as a reference for distinguishing the environment type, the environment type is distinguished from long term trends in detection values in the installation environment of the detection section 2, and the phenomenon type is distinguished based on moment to moment variation in the detection values produced by a fire, and priority can be given to the distinguished phenomenon type when determining the cumulative time.

Furthermore, the cumulative time determining section 13, when extending the cumulative time, after distinguishing the environment type as a first environment type, waits for a predetermined time before extending the cumulative time. In other words, even if the detection section 2 is installed in an environment where smoke tends to occur without fire, the cumulative time can be extended after the fact that no smoke or the like has been produced by an actual fire is confirmed. Accordingly, when an actual fire occurs, the fire can be detected while waiting to extend the cumulative time, thus avoiding delays in fire detection.

Moreover, because when the environment type is a second environment type the cumulative time is shortened without waiting for the predetermined time, when the detection section 2 is installed in an environment where smoke tends not to occur without fire, the cumulative time can be shortened immediately, thereby realizing early detection of fire outbreaks.

Second Embodiment

Next, a second embodiment of the present invention is described. In the present embodiment, in a case where a predetermined time has elapsed after determining the cumulative time according to the distinguished phenomenon type, determination of the cumulative time does not take place even if a phenomenon type newly distinguished in the subsequent time period before the cumulative time is first extended, is a predetermined phenomenon type.

The construction of the second embodiment, except where specifically mentioned, is substantially the same as the construction of the first embodiment, and thus elements which have substantially the same configuration as in the first embodiment are assigned the same reference numerals and/or names as necessary, and description thereof is omitted.

(Fire Presence/Absence Distinguishing Processing)

Figure 8:
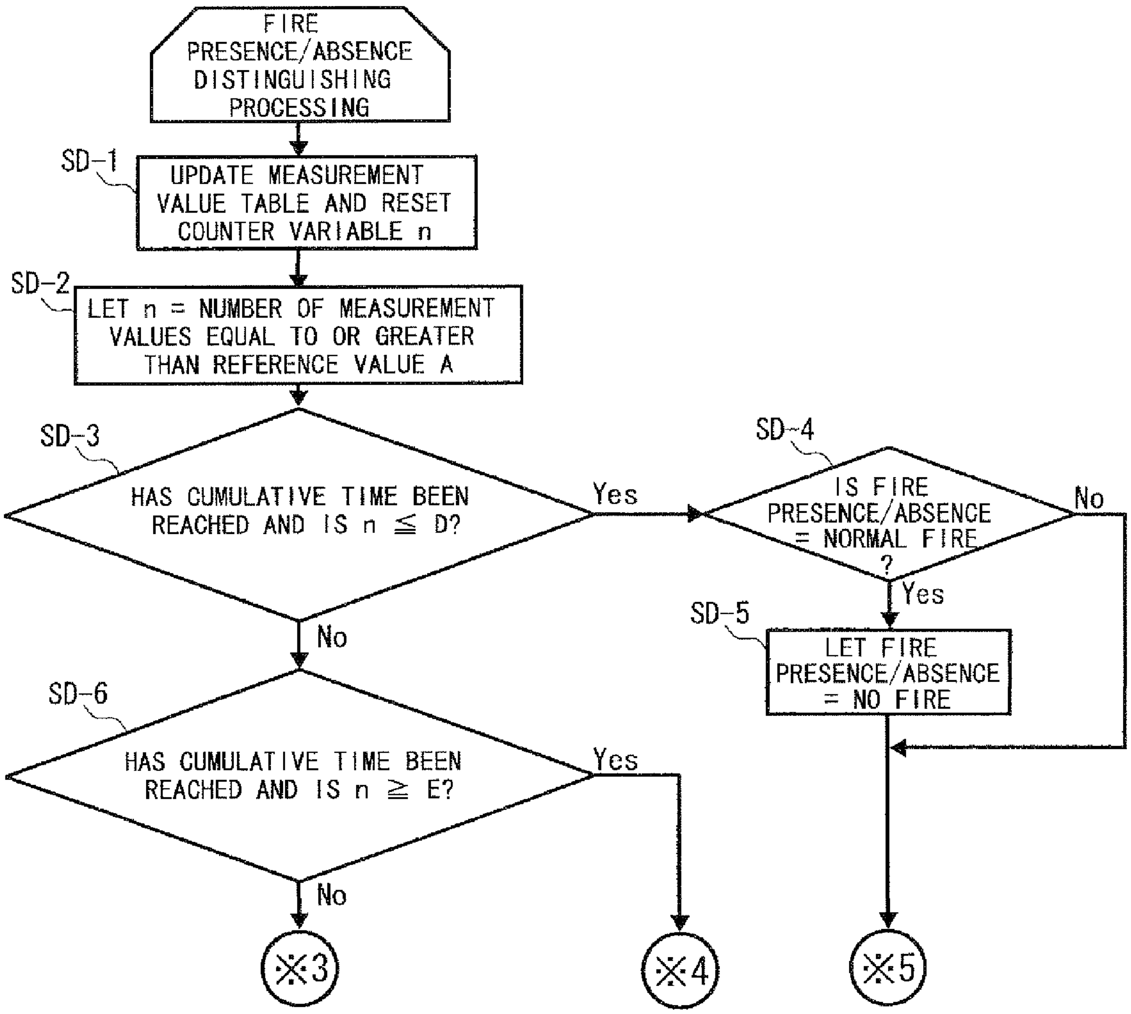
FIG. 8 is a flowchart showing the flow of fire presence/absence distinguishing processing in the same embodiment.
Figure 9:
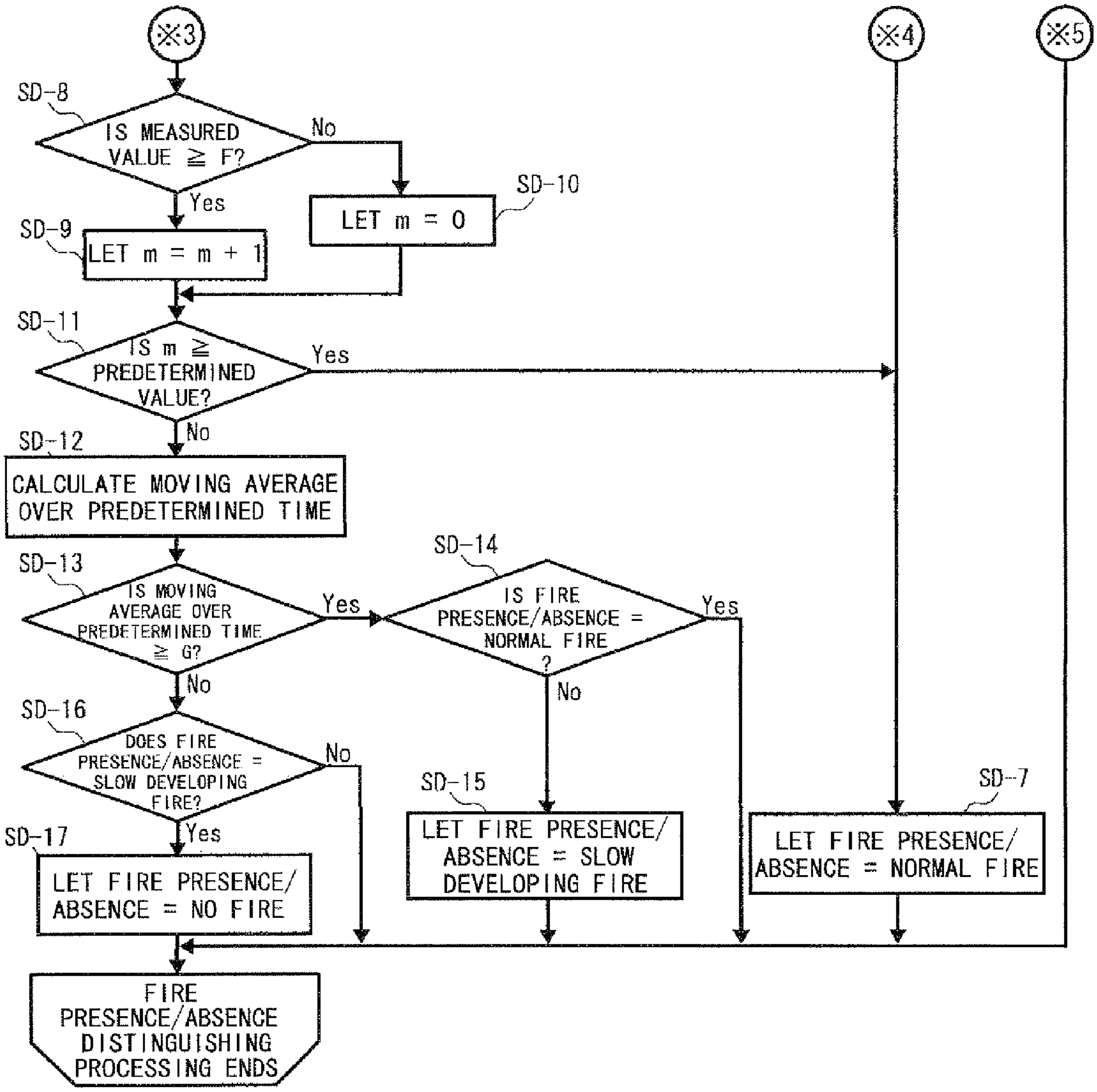
FIG. 9 is a flowchart showing the flow of fire presence/absence distinguishing processing continued from FIG. 8.
Figure 10:
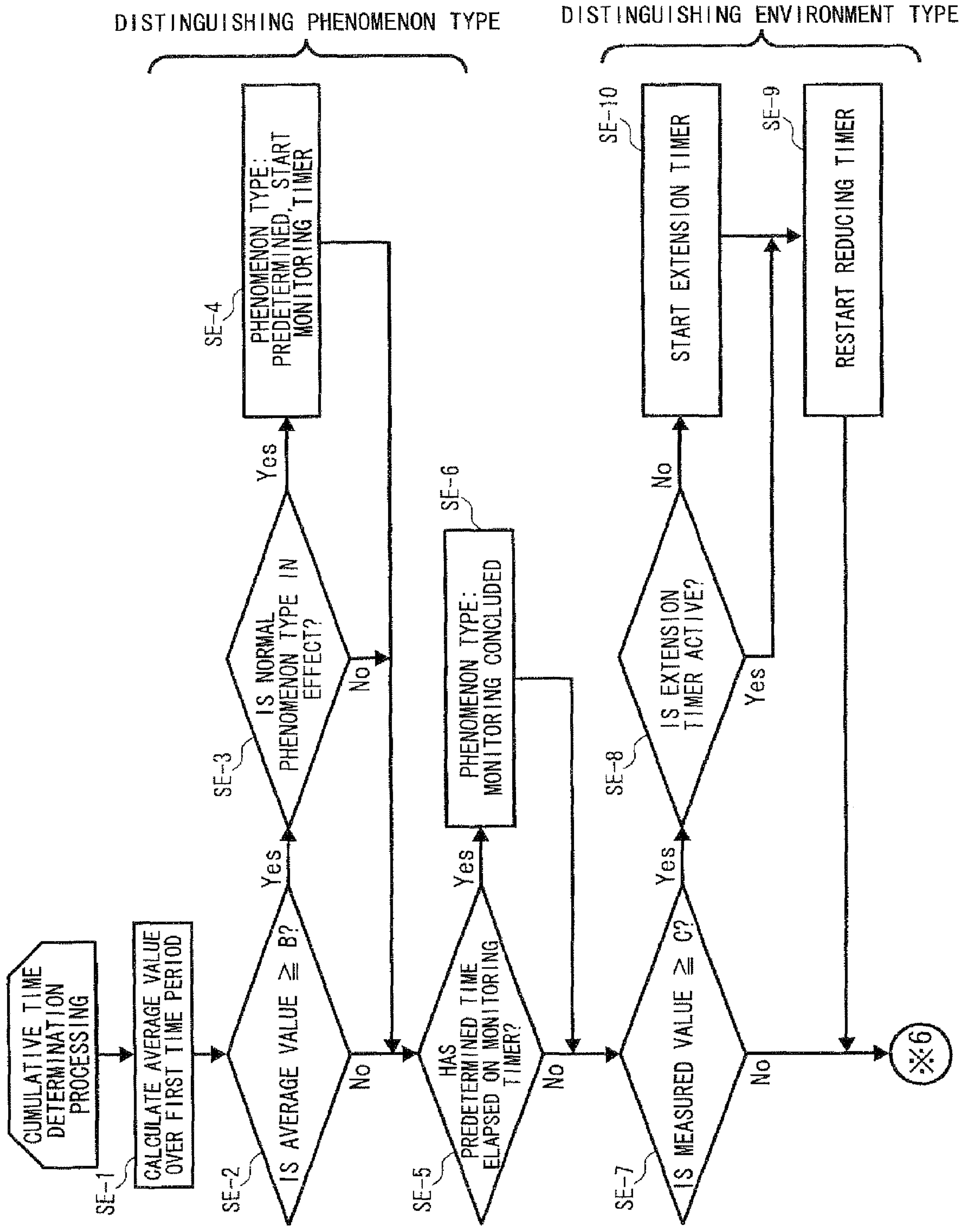
FIG. 10 is a flowchart showing the flow of cumulative time determination processing in the same embodiment.
Figure 11:
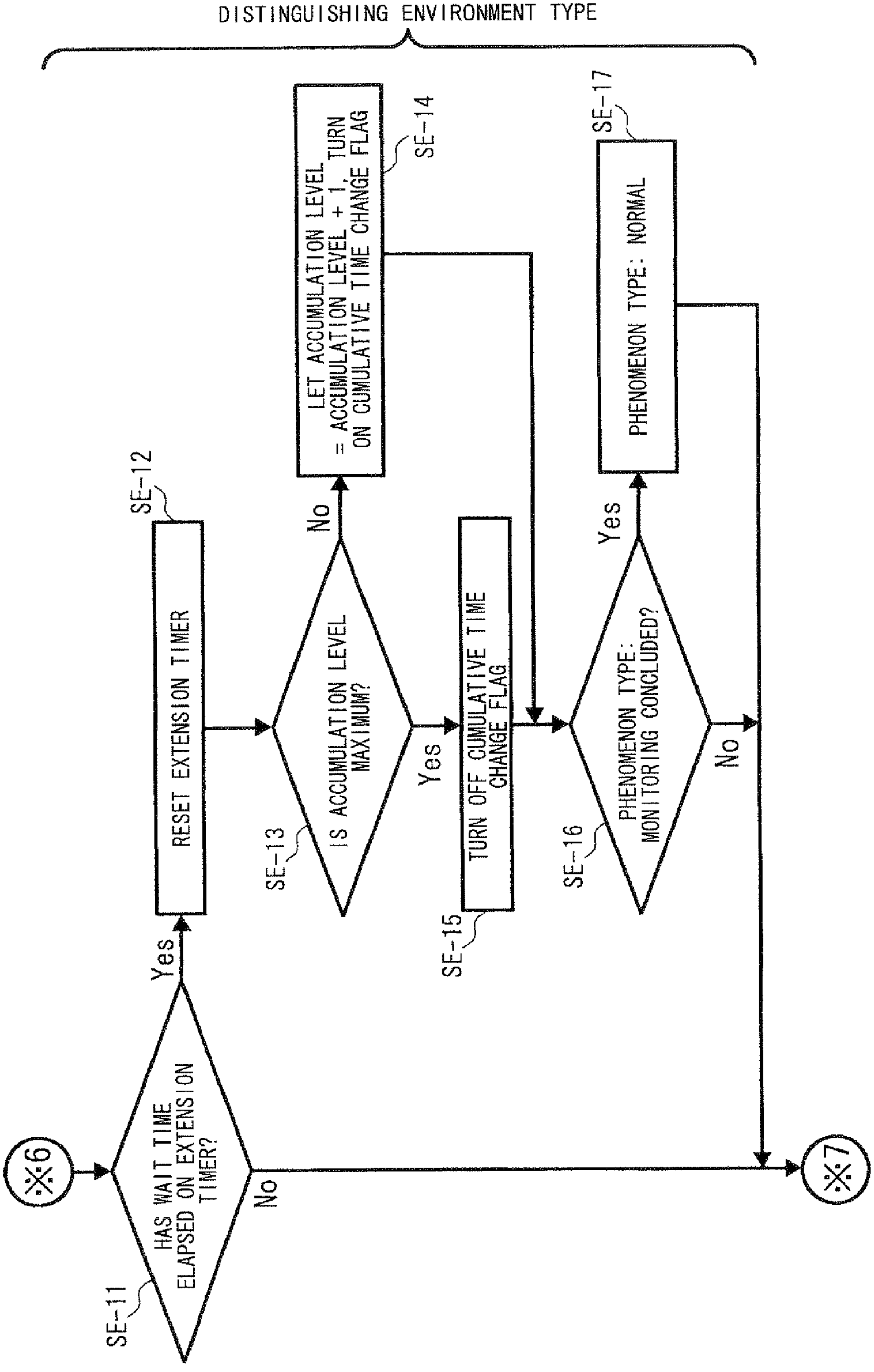
FIG. 11 is a flowchart showing the flow of cumulative time determination processing continued from FIG. 10.
Figure 12:
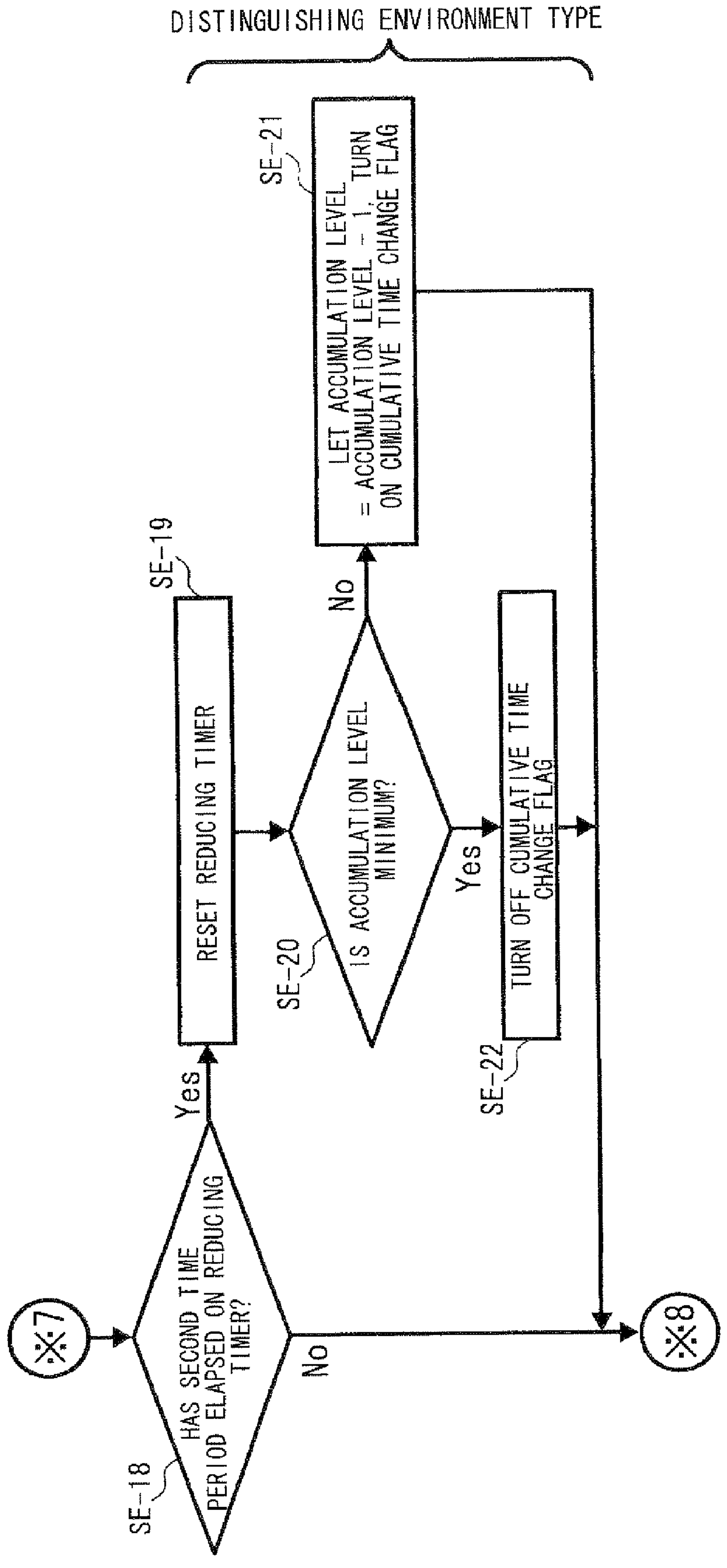
FIG. 12 is a flowchart showing the flow of cumulative time determination processing continued from FIG. 11.
Figure 13:
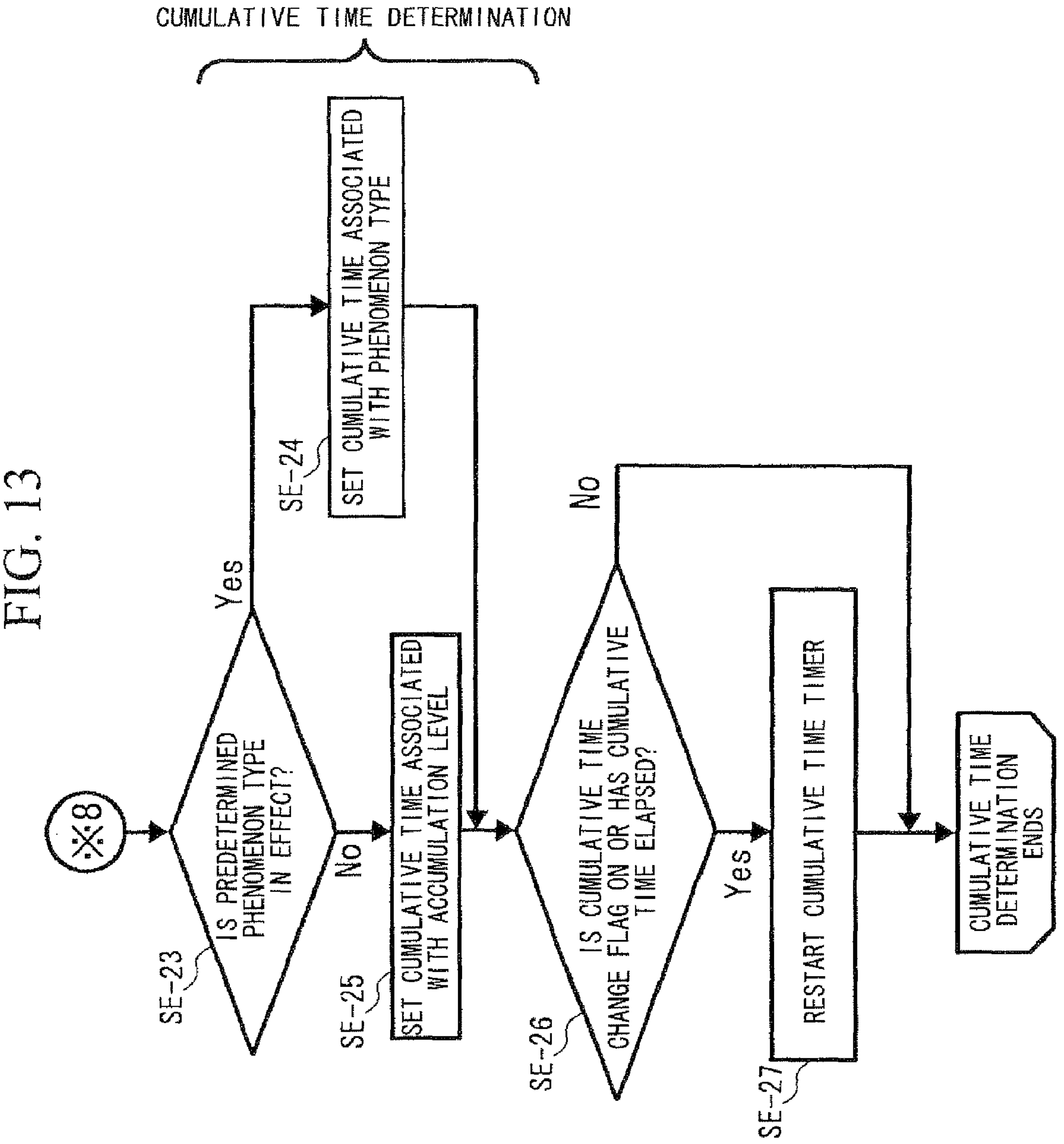
FIG. 13 is a flowchart showing the flow of cumulative time determination processing continued from FIG. 12.

The fire presence/absence distinguishing processing performed in the second embodiment is described. FIG. 8 and FIG. 9 are flowcharts showing the flow of fire presence/absence distinguishing processing.

Step SD-1 and step SD-2 are the same as steps SB-1 and SB-2 in the first embodiment described above, and hence description thereof is omitted.

After step SD-1 and step SD-2, the fire presence/absence distinguishing section 12 determines whether or not the time measured by the cumulative time timer has reached the cumulative time recorded in the storage section 11, and the counter variable n is equal to or less than a predetermined value D (step SD-3). If the time measured by the cumulative time timer has reached the cumulative time recorded in the storage section 11, and the counter variable n is equal to or less than the predetermined value D (Yes in step SD-3), the fire presence/absence distinguishing section 12 distinguishes an absence of fire. Then, the fire presence/absence distinguishing section 12 references the storage section 11, and if "normal fire present" is recorded as the fire occurrence status (Yes in step SD-4), "no fire" is recorded as the fire occurrence status instead (step SD-5). Furthermore, if "normal fire present" is not recorded as the fire occurrence status (No in step SD-4), the status of the storage section 11 is maintained.

On the other hand, if the time measured by the cumulative time timer has reached the cumulative time recorded in the storage section 11, and the counter variable n meets or exceeds a predetermined value E (No in step SD-3, Yes in step SD-6), the fire presence/absence distinguishing section 12 distinguishes the presence of a normal fire, and records this fact in the storage section 11 (step SD-7).

If in step SD-6 the counter variable n is less than the predetermined value E (No in step SD-6), then the fire presence/absence distinguishing section 12 determines whether or not the measured values meet or exceed a predetermined value F which serves as a reference for distinguishing a rapidly developing fire (step SD-8). As a result, if the measured values meet or exceed the predetermined value F (Yes in step SD-8), the value of a counter variable m is incremented by 1 (step SD-9). On the other hand, if the measured value is less than the predetermined value F (No in step SD-8), the value of the counter variable m is reset to 0 (step SD-10).

When the counter variable m meets or exceeds a predetermined value (Yes in step SD-11), the fire presence/absence distinguishing section 12 distinguishes the presence of a normal fire, and records this fact in the storage section 11 (step SD-7).

If the counter variable m is less than the predetermined value (No in step SD-11), the fire presence/absence distinguishing section 12 calculates the moving average of the measured values over a predetermined time (step SD-12), and judges whether or not this moving average meets or exceeds a predetermined value G serving as a reference for distinguishing a slowly developing fire (step SD-13). As a result, if the moving average meets or exceeds the predetermined value G (Yes in step SD-13), and the fire occurrence status in the storage section 11 does not indicate the presence of a normal fire (No in step SD-14), a fire occurrence status indicating a slowly developing fire is recorded in the storage section 11 (step SD-15). On the other hand, if the fire occurrence status recorded in the storage section 11 indicates the presence of a normal fire (Yes in step SD-14), the status of the storage section 11 is maintained.

On the other hand, in a case where the moving average is less than the predetermined value G (No in step SD-13) and a fire occurrence status indicating a slowly developing fire is recorded in the storage section 11 (Yes in step SD-16), a fire occurrence status indicating the absence of fire is recorded in the storage section 11 (step SD-17). On the other hand, if no fire occurrence status indicating a slowly developing fire is recorded (No in step SD-16), the status of the storage section 11 is maintained.

Based on these judgment results, the control section 10, if the occurrence of a normal fire or slowly developing fire is distinguished, issues an alarm by means of the alarm section 3. On the other hand, if a normal status without fire is distinguished, monitoring activity is continued without directing the alarm section 3 to issue an alarm.

(Cumulative Time Determination Processing)

Next, the cumulative time determination processing in the second embodiment is described. FIG. 10 through FIG. 13 are flowcharts showing the flow of cumulative time determination processing.

Step SE-1 and step SE-2 are the same as steps SC-1 and SC-2 in the first embodiment described above, and hence description thereof is omitted.

If the average value calculated in step SE-1 equals or exceeds a predetermined value B (Yes in step SE-2), the cumulative time determining section 13 references the storage section 11 to determine whether or not a normal phenomenon type indicating no predetermined phenomenon is recorded (step SE-3). As a result, if the storage section 11 records that a normal phenomenon type is not in effect (No in step SE-3), the flow advances to the next step. On the other hand, if the storage section 11 indicates a normal phenomenon type (Yes in step SE-3), this is replaced by an indication that a predetermined phenomenon type is in effect, and a monitoring timer is started so as to monitor for a subsequent fire outbreak for a predetermined time period (step SE-4).

Then, the cumulative time determining section 13 determines whether or not the predetermined time has elapsed on the monitoring timer (step SE-5), and if the predetermined time has elapsed (Yes in step SE-5), a phenomenon type indicating that monitoring for the predetermined time has concluded is recorded in the storage section 11 (step SE-6).

The subsequent steps SE-7 to SE-15 are the same as steps SC-5 to SC-13 in the first embodiment described above, and hence description thereof is omitted.

After step SE-14 or step SE-15, the cumulative time determining section 13 references the storage section 11, and judges whether or not the phenomenon type indicates that monitoring for the predetermined time has concluded (step SE-16). If the phenomenon type indicates that monitoring for the predetermined time has concluded (Yes in step SE-16), a normal phenomenon type is recorded in the storage section 11 (step SE-17). On the other hand, if the phenomenon type does not indicate that monitoring for the predetermined time has concluded (No in step SE-16), the status of the storage section 11 is maintained.

The subsequent steps SE-18 to SE-27 are the same as steps SC-14 to SC-23 in the first embodiment described above, and hence description thereof is omitted.

Effects of Second Embodiment

Thus, according to the second embodiment, after a judgment is made that a predetermined phenomenon type is in effect, and further monitoring for a predetermined time is concluded, in the subsequent interval until the cumulative time is first extended, the phenomenon type recorded in the storage section 11 indicates that monitoring has concluded. Accordingly, even if a predetermined phenomenon type is newly distinguished, the cumulative time associated with this predetermined phenomenon type is not set as the cumulative time referenced during the fire presence/absence distinguishing processing. As a result, even if a phenomenon type is distinguished that indicates a high probability of a fire, if no fire is subsequently detected, the cumulative time determining section 13 can extend the cumulative time in order to reduce false alarms in the absence of fire.

Furthermore, because the fire presence/absence distinguishing section 12, when a predetermined number of measurement values are detected in succession that meet or exceed the predetermined value E, distinguishes the presence of fire regardless of the cumulative time, even when a fire spreads rapidly, the fire can be detected at an early stage.

Moreover, because the fire presence/absence distinguishing section 12, when the moving average of the measurement values over a predetermined time meets or exceeds a predetermined value F, distinguishes the presence of a slowly developing fire regardless of the cumulative time, even if the measurement values fall below a reference value A which indicates a normal fire due to the fire producing smoke gradually, the fire can be reliably detected.

[III] Modified Example for the Embodiments

Embodiments of the present invention have been described above. However, various alterations and improvements can be made to the specific construction and measures used in the present invention, provided that they do not depart from the scope of the appended claims.

(Regarding the Problems to be Solved, and Effects of the Invention)

The problems to be solved by the invention and the effects of the invention are not to be interpreted as limited only to the content given above. The present invention may solve problems not disclosed above, and demonstrate effects not disclosed above. Furthermore, the present invention may solve the disclosed problems only in part, or demonstrate the stated effects only in part.

INDUSTRIAL APPLICABILITY

The fire distinguishing device according to the present invention can be applied to a fire distinguishing device which distinguishes the presence or absence of fire based on phenomena such as variation in smoke concentration, can suppress the occurrence of false alarms in the absence of fire, and is of particular utility in a fire distinguishing device capable of issuing an alarm at an early stage in the event of an actual fire.

The invention claimed is:

1. A fire distinguishing device comprising:

a detection device which detects an outbreak of a fire;

a fire presence/absence distinguishing device which distinguishes the presence or absence of the fire; and a cumulative time determining device which determines a cumulative time required for distinguishing the presence or absence of the fire, in the fire presence/absence distinguishing device, wherein the cumulative time determining device distinguishes a phenomenon type of a phenomenon detected by the detection device, based on variation in a fire quantity detected by the detection device over a predetermined first time period, and an environment type of an environment where the detection device is installed, based on variation in a fire quantity over a predetermined second time period which is longer than the first time period, determines the cumulative time according to the distinguished environment type or phenomenon type, and if the distinguished phenomenon type is a predetermined phenomenon type, regardless of the environment type, determines the cumulative time according to the distinguished phenomenon type.

2. The fire distinguishing device according to claim 1, wherein the cumulative time determining device, when extending the cumulative time according to the distinguished environment type, if the distinguished environment type is a predetermined first environment type, waits for a predetermined time without extending the cumulative time, and upon confirming by means of the fire presence/absence distinguishing device that no fire exists within this predetermined time, implements extension of the cumulative time.

3. The fire distinguishing device according to claim 2, wherein the cumulative time determining device, when reducing the cumulative time according to the distinguished environment type, if the distinguished environment type is a predetermined second environment type, implements reduction of the cumulative time without waiting for the predetermined time.

4. The fire distinguishing device according to claim 2, wherein the cumulative time determining device, if the predetermined time has elapsed after the cumulative time is determined according to the distinguished phenomenon type, averts determination of the cumulative time even if a phenomenon type newly distinguished in a subsequent time period before the cumulative time is first extended, is the predetermined phenomenon type.

5. The fire distinguishing device according to claim 1, wherein:

the detection device is a detection device which detects said fire quantity; and the fire presence/absence distinguishing device, if the fire quantity detected by the detection device is equal to or greater than a predetermined state quantity, distinguishes that a fire exists regardless of the cumulative time.

6. The fire distinguishing device according to claim 5, wherein the fire presence/absence distinguishing device, if a moving average of the fire quantity detected by the detection device over a predetermined time is equal to or greater than a predetermined state quantity, judges that a fire exists regardless of the cumulative time.

* * * * *